(12) United States Patent
Okuchi et al.

(10) Patent No.: US 6,234,654 B1
(45) Date of Patent: May 22, 2001

(54) HEIGHT SENSOR AND VEHICULAR HEADLIGHT BEAM AXIS LEVELING APPARATUS

(75) Inventors: Hiroaki Okuchi, Anjo; Takahide Kitahara, Kariya; Fumio Asakura, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/299,560

(22) Filed: Apr. 27, 1999

(30) Foreign Application Priority Data

Apr. 27, 1998 (JP) .................................................. 10-116653

(51) Int. Cl.$^7$ ...................................................... B60Q 1/10
(52) U.S. Cl. ........................................... 362/466; 362/276
(58) Field of Search ................................. 362/459, 460, 362/464–468, 276, 802

(56) References Cited

U.S. PATENT DOCUMENTS

| | | | |
|---|---|---|---|
| 3,687,483 | * 8/1972 | Gull et al. ............................ | 280/6.15 |
| 4,204,270 | * 5/1980 | Piorier d'Ange d'Ors | 362/466 |
| 4,266,790 | * 5/1981 | Uemura et al. ....................... | 280/5.51 |
| 4,310,172 | * 1/1982 | Claude et al. ........................ | 280/6.15 |
| 4,555,120 | * 11/1985 | Frait et al. ........................... | 280/6.15 |
| 4,778,156 | * 10/1988 | Imaizumi et al. ................... | 267/64.21 |

FOREIGN PATENT DOCUMENTS

| | | |
|---|---|---|
| 62-166106 | 7/1987 | (JP) . |
| 9-002148 | 1/1997 | (JP) . |

* cited by examiner

*Primary Examiner*—Alan Cariaso
(74) *Attorney, Agent, or Firm*—Pillsbury Madison & Sutro LLP

(57) ABSTRACT

A height sensor has an exciting coil for generating an alternating magnetic field and a pickup coil for detecting the magnetic field. The exciting coil is fixed to a suspension arm and the pickup coil is fixed to a body so as to face each other. Distance between these coils is determined by a voltage outputted from the pickup coil, and a height of the vehicle is calculated from the distance between these coils by taking the mounting position of the pickup coil on the suspension arm into account. The height sensor is readily fixed and a detection accuracy is improved by setting the mounting position of the pickup coil in a range of ⅒ to ½ of a length of the suspension arm from a connecting portion between the suspension arm and the body.

6 Claims, 6 Drawing Sheets

HEIGHT SENSOR AND VEHICULAR HEADLIGHT BEAM AXIS LEVELING APPARATUS

CROSS REFERENCE TO RELATED APPLICATION

This application is based upon and claims priority from Japanese Patent Application No. Hei 10-116653 filed Apr. 27, 1998, the contents of which are incorporated herein by reference.

BACKGROUND OF THE INVENTION

1. Field of the Invention

The present invention relates to a height sensor for detecting a height of a vehicle by utilizing magnetic field and a vehicular headlight beam axis leveling system for automatically leveling an angle of beam axis of the headlight based on detection results of the height sensor.

2. Description of Related Art

Height sensors have been used in a vehicular suspension control system and in a vehicular headlight beam axis leveling systems. Among the conventional height sensors, there has been one which transforms a relative dislocation of suspension arms in the vertical direction with respect to a body into a rotational angle by a link mechanism linked between the suspension arms, and detects changes in the rotational angle by an angular sensor. The angular sensor used for the height sensor rotates a magnet by the link mechanism to detect the changes of magnetic fluxes caused by the rotation of the magnet by a magnetic detecting element, or rotates a slit disc by the link mechanism to detect the rotation of the disc by a photo-interrupter.

However, the conventional system for detecting the relative dislocation of the suspension arms in the vertical direction and transforming it into the rotational dislocation by the link mechanism as described above has had problems that not only its degree of freedom of design is low but also it requires a large number of parts to be assembled because a space for fixing the link mechanism and a space for rotating the link must be assured in a narrow space above the suspension arms.

In order to solve the problems, Japanese Patent Application Laid-Open No. Hei 9-2148 (JP-A-9-2148) discloses a suspension dislocation detecting apparatus in which an ultrasonic sensor is fixed to a body so as to face to the road surface and to emit ultrasonic toward the road surface to measure a propagation time until receiving the wave reflected from the road surface and to determine the height of the vehicle from the propagation time.

However, the height detection system using the ultrasonic sensor has had a problem that a detection error of the height may be large because it is likely to be influenced by road conditions such as irregularity, weeds and snow on the road surface reflecting the ultrasonic. Although the error caused by the road conditions might be reduced by measuring the road surface around a tire which contacts the road surface, the transmitting and receiving performances of the ultrasonic sensor may be compromised as raindrops and mud adhere the ultrasonic sensor because the space for mounting the sensor is limited and the ultrasonic sensor may not be covered by a case or the like when the ultrasonic sensor is mounted around the tire.

SUMMARY OF THE INVENTION

The present invention is made in light of the foregoing problems, and it is an object of the present invention to provide a height sensor and a vehicular headlight beam axis leveling apparatus, which improve the detection accuracy, regardless of the road surface condition, raindrops and mud.

According to a height sensor of the present invention, the height sensor has a magnetic field generator installed in one of a vehicle body and a movable member for generating an alternating magnetic field, and a magnetic field detector installed in the other of the body and the movable member such that the magnetic field generator and the magnetic field detector are disposed opposite to each other for detecting alternating magnetic field generated by the magnetic field generator.

The movable member is movably connected to the body and is relatively movable to the body according to the height of the vehicle. One of the magnetic field generator and the magnetic field detector is installed in the movable member at a periphery of the body.

Accordingly, the vehicle height is detected by the magnetic field without using the link mechanism, thereby reducing the sensor in size and cost, and mounting the sensor on the vehicle is facilitated. Furthermore, differing from the conventional ultrasonic height sensor, it detects the height without being influenced by the road surface condition, raindrops and mud, and improves the height detection accuracy.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF PREFERRED EMBODIMENTS

[First Embodiment]

A first embodiment of the present invention applied to a vehicular headlight beam axis leveling apparatus will now be explained with reference to FIGS. 1 through 8.

Figure 1:
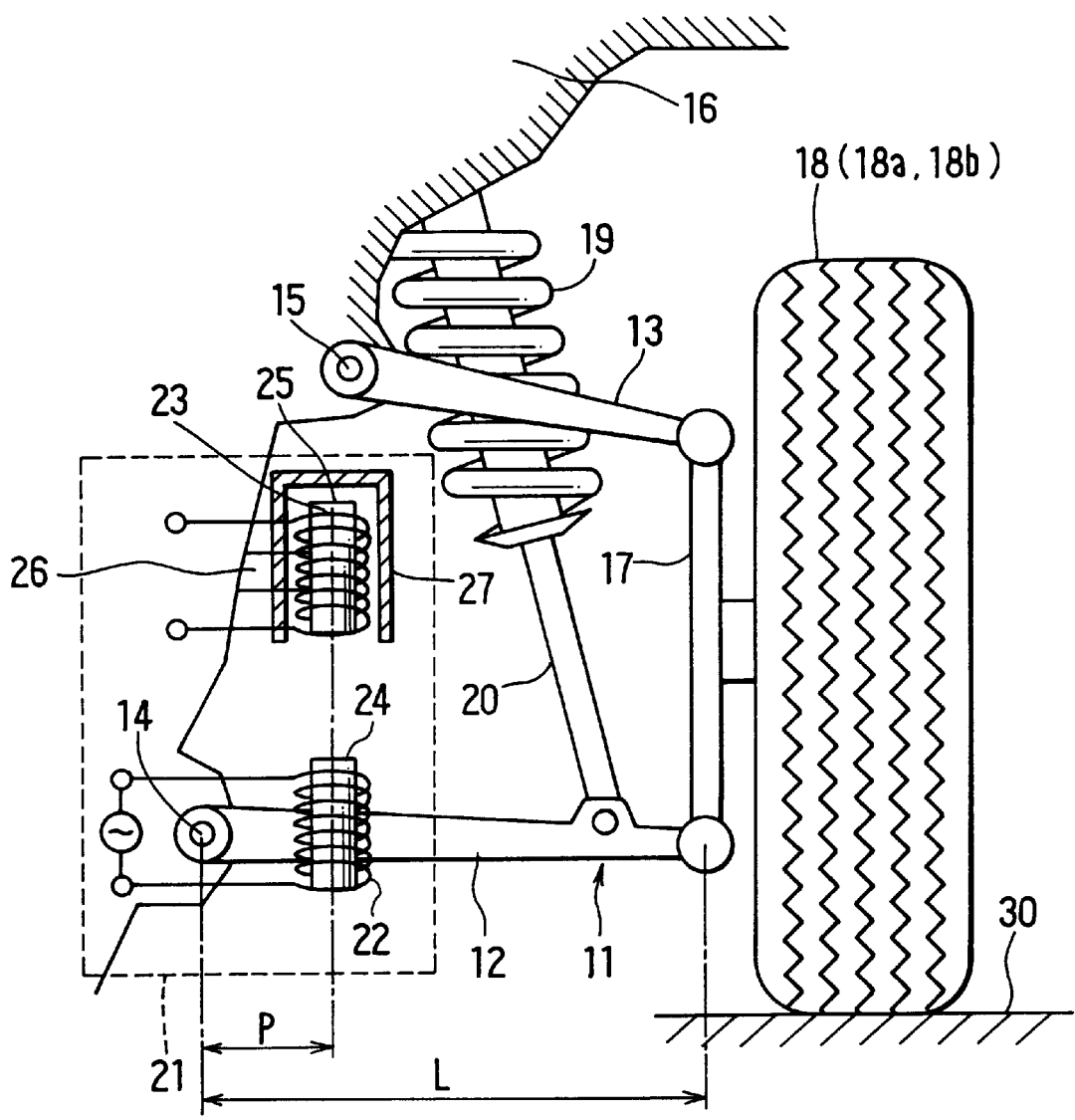
FIG. 1 is a schematic illustration showing a height sensor and the structure around thereof according to a first embodiment of the present invention.

A suspension system 11 shown in FIG. 1 is a wishbone type suspension system for example in which respective one ends of lower and upper suspension arms 12 and 13 are supported by a body 16 via shafts 14 and 15 such that the lower and upper suspension arms 12 and 13 can rotate up and down. A wheel 18 is fixed to the other ends of the suspension arms 12 and 13 via a link member 17 so that the suspension arms 12 and 13 swing up and down on the fulcrum of the shafts 14 and 15 corresponding to the up and down movements of the wheel 18. A buffering coil spring 19 and a shock absorber 20 are provided between the lower suspension arm 12 and the body 16.

Next, the structure of a height sensor 21 will be explained. The height sensor 21 includes an exciting coil 22 as a magnetic field generator for generating an alternating magnetic field and a pickup coil 23 as a magnetic field detector for detecting the magnetic field. The both coils 22 and 23 are wound around cores 24 and 25, respectively. The exciting coil 22 is fixed to the lower suspension arm 12, and the pickup coil 23 is fixed to the body 16 by fitting 26 so as to face to the upper part of the exciting coil 22.

The pickup coil 23 is covered by an electromagnetic shielding cover 27 except the facing portion (lower face) facing to the exciting coil 22. The distance between the exciting coil 22 and the pickup coil 23 is set such that the both coils 22 and 23 do not contact each other when the vehicle height is minimized.

The distance from the shaft 14 to the mounting position of the exciting coil 22 is set within a range of 1/10 to 1/2 of a length of the suspension arm 12 (hereinafter referred to as "arm length"). It is more preferable to set the distance from the shaft 14 to the mounting position of the exciting coil 22 within a range of 1/10 to 2/5 of the arm length of the suspension arm 12. The reason thereof will be described later.

Figure 2:
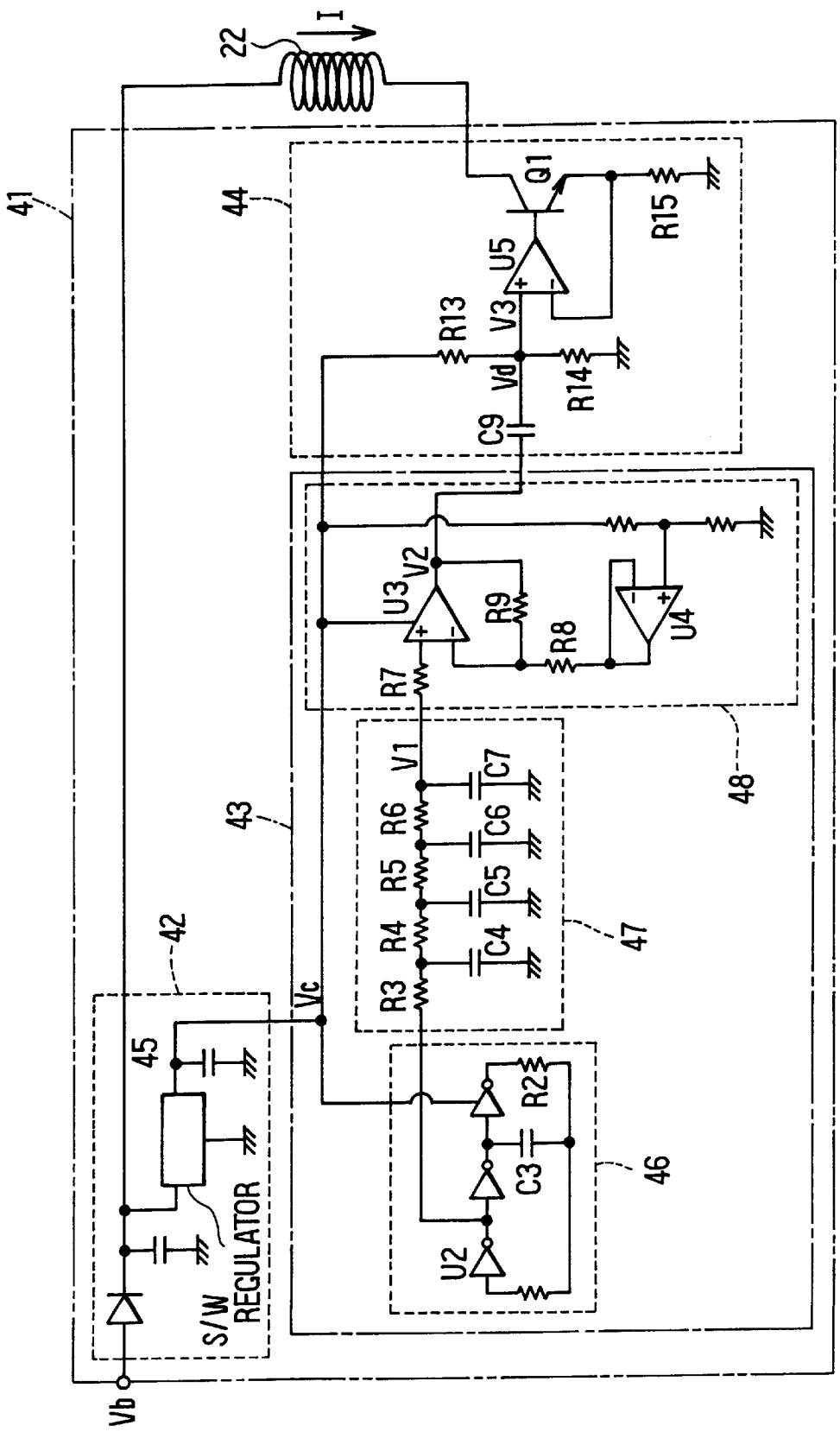
FIG. 2 is a circuit diagram showing a structure of an exciting coil driving circuit 41 according to the first embodiment of the present invention.

Next, the structure of an exciting coil driving circuit 41 for driving the exciting coil 22 will now be explained with reference to FIG. 2.

The exciting coil driving circuit 41 comprises a stabilizing power source circuit 42, a sine-wave generating circuit 43 for generating sine waveforms (alternating waveforms) and a driver circuit 44 for supplying a sinusoidal current to the exciting coil 22. The stabilizing power source circuit 42 includes a switching regulator 45, and converts a relatively high source voltage Vb such as battery voltage into a stabilized source voltage Vc.

The sine-wave generating circuit 43 comprises an oscillating circuit 46, a filtering section 47 and an amplifier circuit 48 which are operated under the stabilized source voltage Vc. The oscillating circuit 46 is a CR oscillating circuit (astable multi-vibrator) having three inverters U2, and outputs rectangular waves of 0–Vc [V] to the filtering section 47 with frequency f determined by a resistor R2 and a capacitor C3. Here, the frequency f may be arbitrary frequency.

The filtering section 47 is a low-pass filter constructed by connecting resistors R3 through R6 and capacitors C4 through C7. It removes higher harmonic components from the rectangular wave outputted from the oscillating circuit 46, and outputs a sinusoidal voltage V1 shown in the following equation DC biased at the potential of the middle point of Vc to the amplifier circuit 48.

$$V1 = Vi \cdot \sin(2\pi ft) + Vc/2$$

Where, Vi is an amplitude of the sinusoical wave.

The amplifier circuit 48 amplifies the voltage with a non-inversion amplifier circuit having an operational amplifier U3 and resistors R7, R9 while adding an offset voltage Vc/2 by an operational amplifier U4 so that the DC bias Vc/2 is not amplified, and outputs a voltage V2 shown in the following equation:

$$V2 = Vo \cdot \sin(2\pi ft) + Vc/2$$

Where, $Vo = (1 + R9/R8) \cdot Vi$.

The driver circuit 44 cuts the DC bias Vc/2 with a capacitor C9, and newly adds DC bias voltage Vd generated by dividing the stabilized source voltage Vc with the ratio of resistance of resistors R13 and R14, and inputs a sinusoidal voltage V3 shown in the following equation to +input terminal of an operational amplifier U5:

$$V3 = Vo \cdot \sin(2\pi ft) + Vd$$

An output terminal of the operational amplifier U5 is connected to a base of a transistor Q1 provided within a current passage of the exciting coil 22. The transistor Q1 controls current to be supplied to the exciting coil 22 from the power source Vb.

The current flowing through the exciting coil 22 is detected by a resistor R15 provided within the current passage of the exciting coil 22, and a voltage generated in the resistor R15 is inputted into —input terminal of the operational amplifier U5. Accordingly, the operational amplifier U5 controls ON/OFF of the transistor Q1 such that the sinusoidal voltage V3 inputted to the +input terminal is always equalized with the voltage generated in the resistor R15 to flow a current I shown in the following equation through the exciting coil 22:

$$I = \{Vo \cdot \sin(2\pi ft) + Vd\}/R15$$
$$= Vo/R15 \cdot \sin(2\pi ft) + Vd/R15$$

Where, the first term represents the sinusoidal current of Vo/R15·sin(2πft), and the second term represents the DC bias current of Vd/R15. The DC bias is changed from Vc/2 to Vd to prevent the DC bias current from fluctuating. The exciting coil 22 generates the alternating magnetic field proportional to the current by this sinusoidal current.

The exciting coil driving circuit 41 constructed as described above has an advantage that the exciting current will not change even if the source voltage Vb connected to one end of the exciting coil 22 fluctuates because the amplitude of the sinusoidal current flowing through the exciting coil 22 is fixed at Vo/R15.

Figure 3:
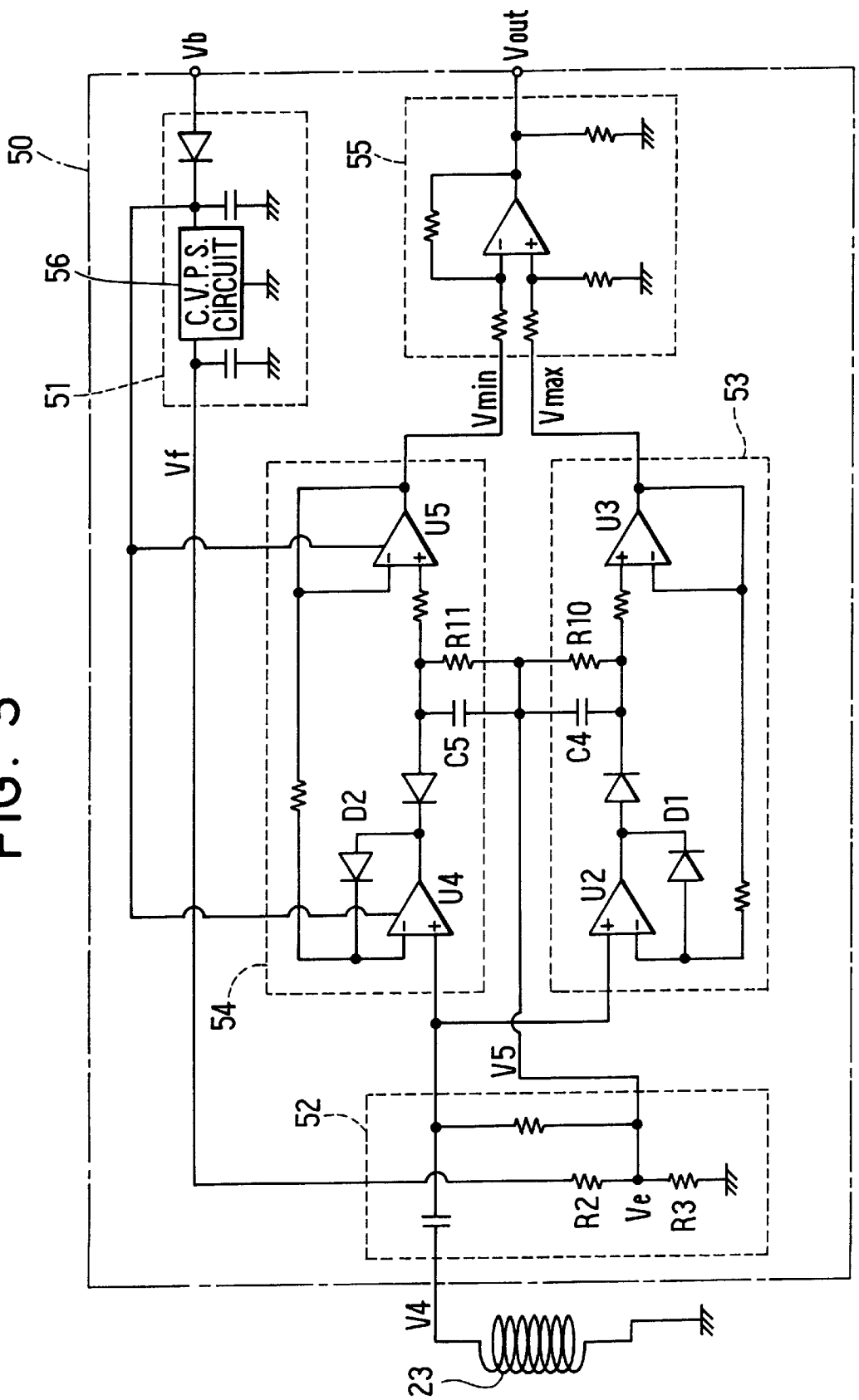
FIG. 3 is a circuit diagram showing a structure of a sensor output processing circuit 50 according to the first embodiment of the present invention.

The structure of a sensor output processing circuit 50 for processing an output signal of the pickup coil 23 will now be explained with reference to FIG. 3.

The sensor output processing circuit 50 comprises a stabilizing power source circuit 51, an offset circuit 52, a maximum value side peak holding circuit 53, a minimum value side peak holding circuit 54 and a differential amplifier circuit 55. The stabilizing power source circuit 51 has a constant voltage power source circuit 56 to transform the source voltage Vb such as battery voltage into stabilized source voltage Vf.

When the alternating magnetic fluxes generated by the exciting coil 22 cross the pickup coil 23, an induced electromotive force V4 shown in the following equation is generated in the pickup coil 23:

$$V4 = k \times Io \cdot \cos(2\pi ft)$$

Where, k is a proportional constant, and $Io = 2\pi f \times Vo/R15$.

The offset circuit 52 generates DC bias voltage Ve by dividing the stabilized source voltage Vf by the ratio of resistance of resistors R2 and R3, and offsets the induced electromotive force V4 by the DC bias voltage Ve by applying the DC bias voltage Ve to the induced electromotive force V4 outputted from the pickup coil 23, and inputs a voltage V5 shown in the following equation to the maximum value side peak holding circuit 53 and the minimum value side peak holding circuit 54:

$$V5 = \{k \times Io \cdot \cos(2\pi ft)\} + Ve$$

The maximum value side peak holding circuit 53 charges hold capacitor C4 by two operational amplifiers U2 and U3 according to an input voltage V5. The minimum value side peak holding circuit 54 charges hold capacitor C5 by two operational amplifiers U4 and U5 according to the input voltage V5. By making the directions of the diodes D1 and D2 opposite to each other, the maximum value side and minimum value side peak holding circuits 53 and 54 hold the maximum value Vmax (peak value) of the input voltage V5 to the hold capacitor C4 of the maximum value side peak holding circuit 53 and hold the minimum value Vmin (bottom value) of the inputted voltage V5 to the hold capacitor C5 of the minimum value side peak holding circuit 54.

Discharge resistors R10 and R11 are connected in parallel to the hold capacitors C4 and C5 respectively, and electric charges charged in the hold capacitors C4 and C5 are discharged slowly with time constants of C4×R10 and C5×R15, respectively. Accordingly, the maximum value Vmax (peak value) and the minimum value vmin (bottom value) of the input voltage V5 are detected continuously by adjusting the discharge resistors R10 and R11.

The differential amplifier circuit 55 amplifies the difference between the maximum value vmax and the minimum value Vmin inputted from the maximum value side and minimum value side peak holding circuits 53 and 54, and outputs as a sensor output Vout.

Figure 6:
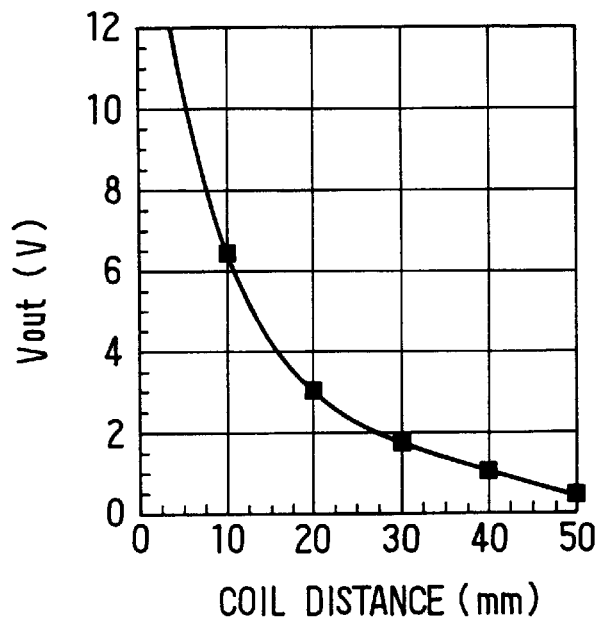
FIG. 6 is a characteristic chart showing the relationship between a coil distance and a sensor output Vout according to the first embodiment of the present invention.

The voltage V4 to be induced by the pickup coil 23 or the sensor output Vout is in inverse proportion to the cube of the distance between the exciting coil 22 and the pickup coil 23, so that the distance between the coils 22 and 23 is determined by the sensor output Vout. FIG. 6 shows one example of characteristic change of the sensor output Vout with respect to the distance between the coil 22 and the coil 23.

Figure 4:
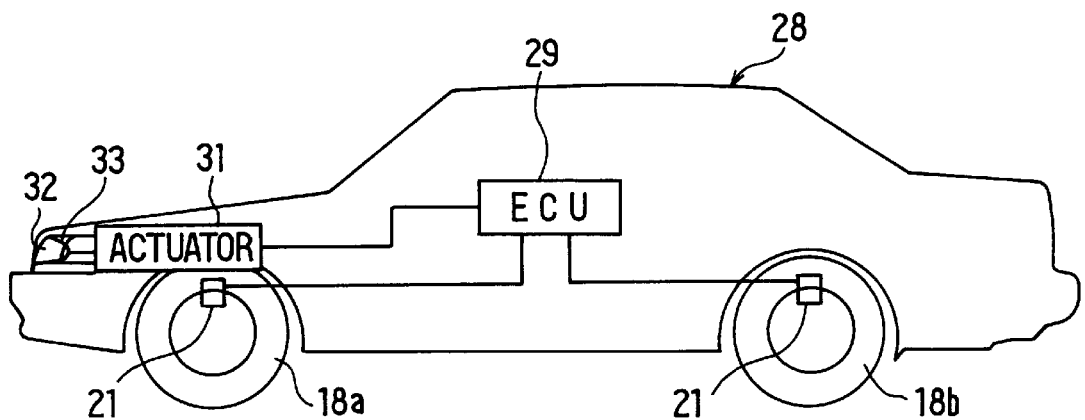
FIG. 4 is a schematic illustration showing a structure of a vehicular headlight beam axis leveling apparatus according to the first embodiment of the present invention.

The height sensors 21 constructed as described above are installed at the front wheel 18a and the rear wheel 18b on the driver's seat side of the vehicle 28 by one each as shown in FIG. 4. The output Vout of each of the height sensors 21 is taken into an electronic control circuit (hereinafter referred to as "ECU") 29.

The ECU 29 is mainly comprised of a microcomputer. It computes an angle of inclination in the longitudinal direction of the body 16 with respect to the road surface 30 from the outputs Vout of the respective height sensors 21 by executing a headlight beam axis control program in FIG. 5, and controls an angle of the beam axis of a headlight 32 by adjusting an angle of a light reflecting plate 33 within the headlight 32 by controlling an actuator 31 based on the computation result.

Figure 5:
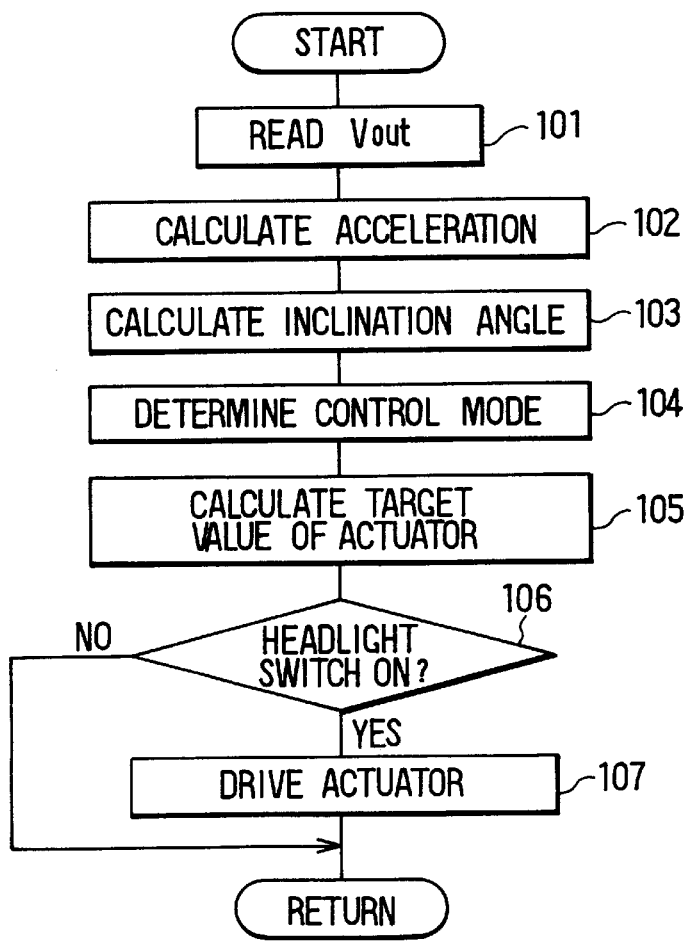
FIG. 5 is a flowchart showing a flow of processes of a headlight beam axis control program according to the first embodiment of the present invention.

The headlight beam axis control program in FIG. 5 is activated every predetermined time after turning on an ignition switch not shown. When this program is activated, the outputs Vout of the height sensors 21 at the front and rear of the vehicle are read into the ECU 29 via an A/D converter not shown in Step 101. Then, an acceleration of the vehicle is calculated based on changes of vehicle speed data from a wheel speed sensor not shown in Step 102.

In Step 103, the distance between the exciting coil 22 and the pickup coil 23 is determined from the sensor output Vout by making reference to a sensor output characteristic map shown in FIG. 6 for example which is stored in advance in a ROM not shown within the ECU 29, and the vehicle height is calculated from the distance between the coils 22 and 23 by taking the mounting position where the pickup coil 23 is fixed with respect to the suspension arm 12 into account. Finally, in step 103, the inclination angle in the longitudinal direction of the body 16 is calculated based on respective values of height in the longitudinal direction of the vehicle calculated from respective outputs Vout of the height sensors 21 fixed at the front and rear of the vehicle and the distance between the axle shafts (distance between the height sensors 21 at the front and rear sides of the vehicle). This process in Step 103 corresponds to inclination angle computing means of the present invention.

Then, a control mode is determined in Step 104 from the inclination angle of the body, the vehicle speed and the acceleration. The following is one example of the respective control modes, criteria and control methods thereof.

(1) When the vehicle speed is 2 km/h or less as the criterion, the control mode is decided to be a stop mode and the control is made responding linearly to the angle of inclination of the body.

(2) When the vehicle speed is 2 km/h or more and the acceleration is ±2 km/s$^2$ or more as the criterion, the control mode is decided to be a quick acceleration/deceleration mode and the control is made responding linearly to the angle of inclination of the body.

(3) When the vehicle speed is 2 km/h or more and the acceleration is less than ±2 km/s$^2$ and more than ±1 km/s$^2$ as the criterion, the control mode is decided to be a slow acceleration/deceleration mode and the control is made with an average value of the angle of inclination of the body in one second.

(4) When the vehicle speed is 2 km/h or more and the acceleration is less than ±1 km/s$^2$ as the criterion, the control mode is decided to be a constant speed mode and the control is made with an average value of the angle of inclination of the body in ten seconds.

(5) When the angle of inclination of the body fluctuates plus and minus as the criterion, the control mode is decided to be a bad road mode and the control is made with an average value of the angle of inclination of the body in ten seconds.

In Step 105, a target value of the actuator 31 corresponding to each control mode is calculated. In Step 106, it is determined whether or not a headlight switch not shown is turned on. When it is in ON-state, the process advances to Step 107 to control the angle of the beam axis of the headlight 32 by driving the actuator 31 to the target value and adjusting the angle of the light reflecting plate 33. When the headlight switch is in OFF-state, this program is finished without driving the actuator 31. Thereafter, the angle of the beam axis of the headlight 32 is controlled according to the inclination angle of the body, the vehicle speed and the acceleration at each time by executing this program every predetermined time period.

Next, the mounting position of the height sensor 21 will now be explained in detail. A range of change of height on the axle is, for example, −80 mm (maximum variation in the direction in which the height decreases) to +50 mm (maximum variation in the direction in which the height increases). The exciting coil 22 and the pickup coil 23 are mounted on the suspension arm 12 and the body 16 respectively such that respective center axes of the coils 22 and 23 are aligned and they vertically oppose each other when the height variation is 0 mm.

Figure 7:
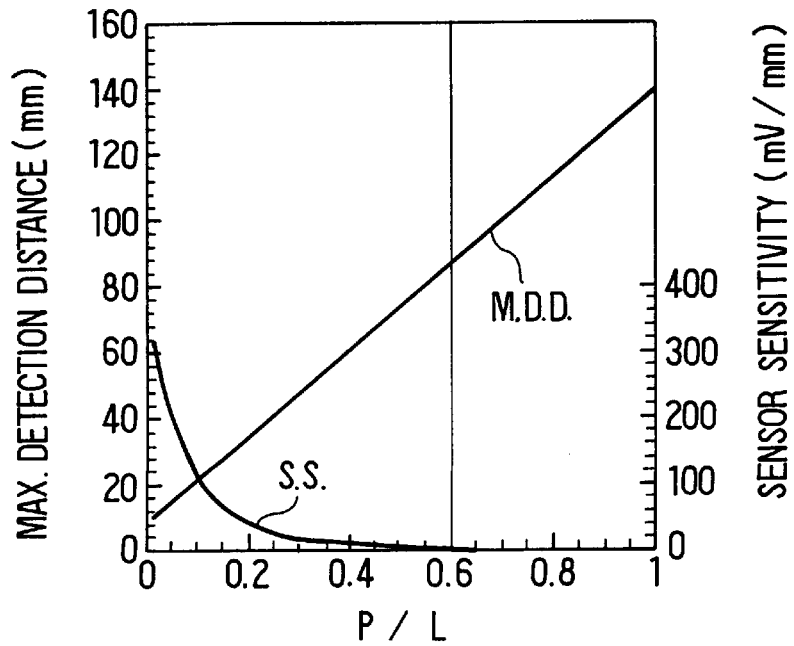
FIG. 7 is a characteristic chart showing the relationships between the position (P/L) where a pickup coil is fixed and the sensor sensitivity, and between P/L and a maximum detection distance according to the first embodiment of the present invention.

When a rate of distance P (distance from the shaft 14 on the body 16 side to the central axis of the pickup coil 23) to the armlength L (length of the suspension arm 12), i.e., P/L, is defined as "mounting position" here, the maximum distance of the height sensor 21 to be detected (maximum detection distance=M.D.D.) changes in proportion to the mounting position as shown in FIG. 7. In other words, the smaller the mounting position P/L (the closer to the body 16), the smaller the maximum detection distance becomes because the variation (dislocation amount) of the suspension arm 12 at the mounting position becomes small, and the larger the mounting position P/L (the closer to the wheel 18), the larger the maximum detection distance becomes in contrary because the variation of the suspension arm 12 at the mounting position becomes large.

The output characteristic of the magnetic height sensor 21 is characterized in that the longer the distance between the coil 22 and the coil 23, the less the variation of the sensor output Vout becomes as shown in FIG. 6. In other words, the longer the distance, the less the sensor sensitivity "S.S." (it is a sensor output per unit variation of the height at the sensor position and is determined by the inclination of the output characteristic curve) becomes. Accordingly, the sensor sensitivity is minimized when the height varies in maximum. As shown in FIG. 7, the minimum value of the sensor sensitivity becomes smaller as the mounting position P/L becomes larger.

Figure 8:
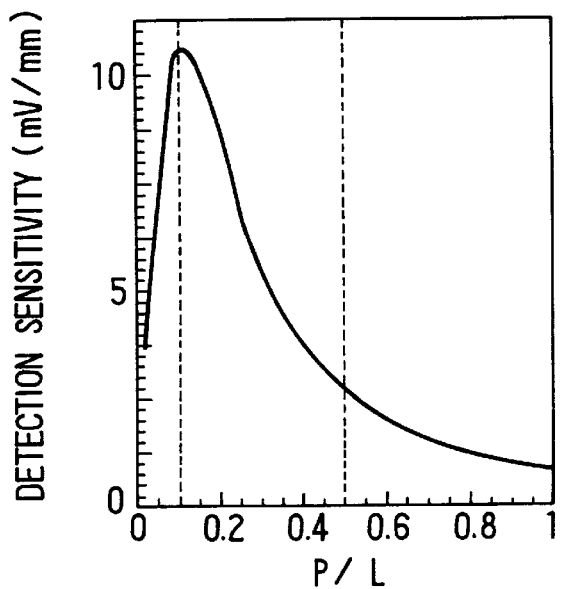
FIG. 8 is a characteristic chart showing the relationship between P/L and the detection sensitivity according to the first embodiment of the present invention.

The variation of detection sensitivity (sensor output per unit variation of the actual height) due to the mounting position P/L is determined by multiplying the sensor sensitivity with the mounting position P/L, and has a characteristic as shown in FIG. 8. As it is apparent from FIG. 8, the variation of the detection sensitivity according to the mounting position P/L is maximized when the mounting position P/L is about 0.1. However, the mounting position P/L must be 0.1 or greater because it becomes difficult to mount the sensor if the mounting position gets closer to the body 16 than 0.1 of P/L because a supporting section of the body 16 for supporting the shaft 14 obstructs. The detection sensitivity becomes smaller as the mounting position P/L becomes greater when the mounting position P/L is greater than 0.1, and the sensor output processing circuit 50 is required to be more accurate.

Taking such characteristics into consideration, when the mounting position P/L is set in a range of 0.1 to 0.5, or more preferably in a range of 0.1 to 0.4, mounting the height sensor 21 is facilitated, and the variation of the sensor output with respect to the resolution performance is fully assured, and the detection accuracy is improved.

Furthermore, the sensor sensitivity is in proportion to $I \cdot a^2$, where a is a radius of the exciting coil 22 and I is current flows through the excited coil 22. Thus, the coil current I and the coil radius a become smaller as the mounting position P/L becomes smaller.

According to the height sensor 21 of the first embodiment, the vehicle height is detected by the magnetic field without using the link mechanism, thereby reducing the sensor in size and cost, and mounting the sensor on the vehicle is facilitated. Furthermore, differing from the conventional ultrasonic height sensor, it detects the height without being influenced by the road surface condition, raindrops and mud, and improves the height detection accuracy.

Further, considering that electrical parts which leak magnetic field to the outside such as an alternator are installed in the vehicle 28, the pickup coil 23 is covered by the electromagnetic shielding cover 27 except the opposing surface to the exciting coil 22 side in the first embodiment, so that the SN ratio of the sensor output is improved by blocking the external magnetic field from infiltrating to the pickup coil 23 by the electromagnetic shielding cover 27.

It is noted that no electrical parts which leaks magnetic field to the outside is mounted near the height sensor 21 on the rear wheel 18b side. Therefore, the electromagnetic shielding cover 27 may be omitted from the height sensor 21 of the rear wheel 18b side. In short, the electromagnetic shielding cover 27 needs to be attached to the pickup coil 23 when the height sensor 21 is installed at the position relatively close to electrical parts which leak magnetic field to the outside such as the vicinity of the front wheel 18a of the vehicle.

Although the exciting coil 22 has been fixed to the suspension arm 12, and the pickup coil 23 has been fixed to the body 16 in the first embodiment, the exciting coil 22 may be fixed to the body 16, and the pickup coil 23 may be fixed to the suspension arm 12 instead.

[Second Embodiment]

Figure 9:
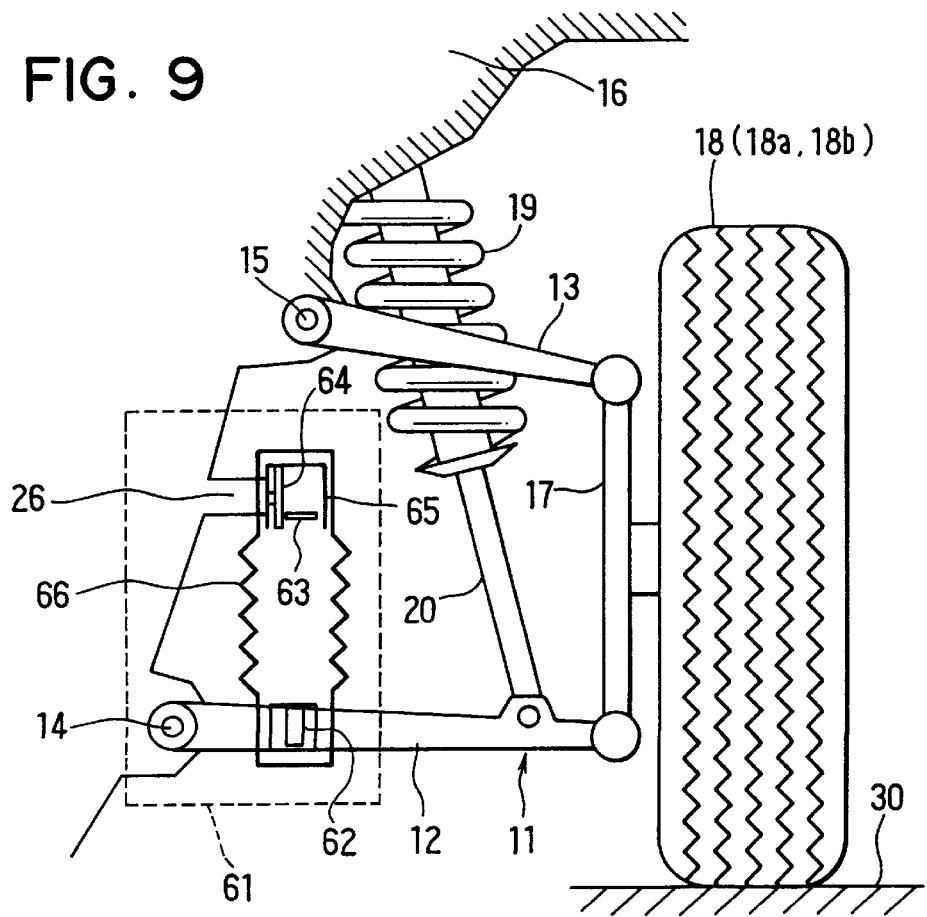
FIG. 9 is a schematic illustration showing a height sensor and the structure around thereof according to a second embodiment of the present invention.

A second embodiment of the present invention is shown in FIG. 9. In the second embodiment, components which are substantially the same as those in the first embodiment are assigned the same reference numerals, and the explanation for the same as those in the first embodiment is obviated from the following descriptions.

A height sensor 61 includes a permanent magnet 62 fixed to the suspension arm 12 as a magnetic field generator and a magnetism detecting element 63, such as a Hall element or a magnetic resistant element, is disposed above the permanent magnet 62 as a magnetic field detector for detecting the magnetic field of the permanent magnet 62. A SmCo series magnet may be used as the permanent magnet 62 for example because the SmCo series magnet has a good temperature characteristic and a large magnetic field strength. However, a ferrite or neodymium series magnet may be used when the detection distance is short or when a narrow temperature range is used.

Meanwhile, the magnetism detecting element 63 is installed in a circuit board 64, and the circuit board 64 is fixed to the body 16 via a fixture 26. The magnetism detecting element 63 and the circuit board 64 are covered by an electromagnetic shielding cover 65 except the opposing surface to the permanent magnet 62 side (lower face).

It is noted that a magnetic substance core not shown made of silicon steel plate or ferrite may be disposed on the back (upper side) of the magnetism detecting element 63 when the sensitivity of the magnetism detecting element 63 is small. Accordingly, the sensitivity of the magnetism detecting element 63 may be enhanced by increasing magnetic fluxes crossing the magnetism detecting element 63 by concentrating the magnetic fluxes from the permanent magnet 62 to the magnetic substance core.

In this case, the mounting position P/L of the permanent magnet 62 is set in the range of 1/10 to 1/2, or more preferably, in the range of 1/10 to 2/5 of the length of the suspension arm 12 from the shaft 14 in the same manner with the mounting position of the pickup coil 23 in the first embodiment.

The permanent magnet 62, the magnetism detecting element 63 and the circuit board 64 are covered by one non-magnetic cover 66 altogether. This non-magnetic cover 66 is formed in bellows so that it can extend/contract in the vertical direction corresponding to the up and down movements of the suspension arm 12.

According to the height sensor 61 constructed as described above, the magnetism detecting element 63 opposing to the permanent magnet 62 generates a voltage proportional to the strength of magnetic field from the permanent magnet 62. Because the strength of the magnetic field reaching the magnetism detecting element 63 is in inverse proportion to the distance between the permanent magnet 62 and the magnetism detecting element 63, the magnetism detecting element 63 generates a voltage according to the distance from the permanent magnet 62.

Accordingly, the distance between the permanent magnet 62 and the magnetism detecting element 63 is calculated from the voltage outputted from the magnetism detecting element 63, and the height of the vehicle is determined by this distance and the mounting position P/L of the permanent magnet 62.

According to the first embodiment, the magnetic contaminant such as iron sand is prevented from adhering to the magnetic field generating section (the exciting coil 22) because the exciting coil 22 generates the alternating magnetic field. However, there is a possibility that the magnetic substance such as iron sand is liable to be adhered to the permanent magnet 62 because the permanent magnet 62 generates DC magnetic field. Therefore, the magnetic field strength may be reduced by the adhered magnetic substance, and the detection accuracy for the vehicle height may be compromised.

To solve this problem, according to the second embodiment, the permanent magnet 62 and the magnetism detecting element 63 are covered by the bellows-like non-magnetic cover 66 altogether. Accordingly, the magnetic substance such as iron sand is prevented from adhering to the permanent magnet 62 by the non-magnetic cover 66, and the decrease of the magnetic field strength caused by adhesion of the magnetic substance is prevented, and the detection accuracy is improved. Further, because the permanent magnet 62 is used as the magnetic field generator, the driving circuit described in the first embodiment is obviated and the circuit structure is simplified. Beside that, the same advantages as the first embodiment is obtained according to the second embodiment.

Although the permanent magnet 62 has been fixed to the suspension arm 12 and the magnetism detecting element 63 has been fixed to the body 16 in the second embodiment described above, the permanent magnet 62 may be fixed to the body 16 and the magnetism detecting element 63 may be fixed to the suspension arm 12 instead.

While the height sensor has been fixed to the suspension arm 12 on the lower side in the first and second embodiments, the position where the height sensor is fixed is not limited to such position and may be a movable member which moves up and down corresponding to the up and down movements of the body 16. For instance, the height sensor may be fixed to the upper suspension arm 13 or the shock absorber 20. The suspension system in which the height sensors 21 and 61 are fixed is not limited to the wishbone type suspension system shown in FIGS. 1 and 9. For instance, they may be fixed to a suspension system of various types such as a coil spring type, strut type and multi-link type suspension systems.

Further, the application of the height sensor of the present invention is not limited to the vehicular headlight beam axis leveling apparatus. For instance, the height sensor of the present invention may be applicable to a suspension control apparatus or a height control apparatus. It is also possible to arrange so as to detect an angle of inclination (rolling angle) in the right and left directions of the body by fixing the height sensors of the present invention to the right and left wheels of the vehicle.

Furthermore, it is possible to arrange so as to cover the exciting coil 22 and the pickup coil 23 by a non-magnetic cover extendible in the vertical direction in the first embodiment similarly to the second embodiment.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A height sensor for detecting a height of a vehicle having a body and a movable member which is movably connected to the body and which is relatively movable to the body according to the height of the vehicle, said height sensor comprising:
   a magnetic field generator installed in one of the body and said movable member for generating an alternating magnetic field; and
   a magnetic field detector, installed in the other of the body and said movable member such that said magnetic field generator and said magnetic field detector are disposed opposite to each other, for detecting said alternating magnetic field and for outputting a detected signal indicating a distance from said magnetic field generator, wherein;
   a mounting position of said one of said magnetic field generator and said magnetic field detector to be installed in said movable member is within a range of $\frac{1}{10}$ to $\frac{1}{2}$ of a length of said movable member from a connection between the body and said movable member.

2. A height sensor as in claim 1, wherein said mounting position of said one of said magnetic field generator and said magnetic field detector to be installed in said movable member is in the proximity of $\frac{1}{10}$ of a length of said movable member from a connection between the body and said movable member.

3. A height sensor as in claim 1, wherein said magnetic field generator includes a permanent magnet.

4. A height sensor as in claim 1, wherein a magnetic path between said magnetic field generator and said magnetic field detector is covered by an extensible non-magnetic cover.

5. A height sensor as in claim 1, wherein said magnetic field detector, except an opposing portion facing to said magnetic field generator, is covered by an electromagnetic shielding cover.

6. A vehicular headlight beam axis leveling apparatus for controlling a headlight beam axis, comprising:
   a height sensor as in claim 1;
   inclination angle computing means for calculating an inclination angle of the body with reference to a road surface based on the height of the vehicle detected by said height sensor; and
   an actuator for adjusting the headlight beam axis based on said inclination angle calculated by said inclination angle computing means.

* * * * *